US006484313B1

(12) United States Patent
Trowbridge et al.

(10) Patent No.: US 6,484,313 B1
(45) Date of Patent: Nov. 19, 2002

(54) COMPILING AND PERSISTING OF INTERMEDIATE LANGUAGE CODE

(75) Inventors: Sean E. Trowbridge, Redmond, WA (US); James S. Miller, Bellevue, WA (US); Brian D. Harry, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,799

(22) Filed: Jun. 30, 1999

(51) Int. Cl.[7] .............................................. G06F 9/45
(52) U.S. Cl. ...................................................... 717/146
(58) Field of Search .............................. 717/5, 6, 7, 9, 717/3, 4, 11, 136–161; 707/203

(56) References Cited

U.S. PATENT DOCUMENTS

| 6,112,025 | A | * | 8/2000 | Mulchandani et al. | 717/9 |
| 6,157,948 | A | * | 12/2000 | Inoue et al. | 709/219 |
| 6,158,048 | A | * | 12/2000 | Luch et al. | 717/9 |
| 6,289,506 | B1 | * | 9/2001 | Kwong et al. | 717/9 |
| 6,324,688 | B1 | * | 11/2001 | Brown et al. | 717/9 |

FOREIGN PATENT DOCUMENTS

WO    WO 99/42925    8/1999

OTHER PUBLICATIONS

Hsieh et al. Java Bytecode to Native Code Translation: The Caffeine Prototype and Preliminary Results. IEEE. pp. 90–97. 1996.*

Hua et al. Platform Independence Issues in Compiling Java Bytecode to Native Code. IEEE. pp. 530–532. Feb. 2000.*

The Java Hotspot Performance Engine Data Sheet, available on the web site http://java.sun.com, date unavailable.

X/Open Guide: Architecture Neutral Distribution Format (XANDF), Jan. 1996, ISBN 1–85912–141–1, X/Open Document No. G508.

Plezbert et al, Does just in time better late than never, Conference record on POPL, ACM Sigplan–Sigact Symposium on Principles of Programming Languages, US, New York, vol. 28, Jan. 15, 97, pp. 120–131.

Weiss et al, TurboJ, A Java bytecode–to–native compiler, Proceedings of the ACM Sigplan workshop on Languages, compilers, and tools for embedded systems LCTES '98, Montreal, Canada, Jun. 19–20, 1998.

Proebsting et al, TOBA: Java for applications, a way ahead of time (WAT) compiler, Proceedings of the third USENIX conference on object–oriented technologies and systems, COOTS '97, Portland, Oregon, Jun. 16–20, 1997.

* cited by examiner

Primary Examiner—Kakali Chaki
Assistant Examiner—Wei Zhen
(74) Attorney, Agent, or Firm—Banner & Witcoff, Ltd.

(57) ABSTRACT

The invention relates to compilation and persistence of intermediate language code. In one embodiment, a computer-implemented method first inputs intermediate language code. The method compiles this code into corresponding native code, in a non-just-in-time manner. For example, the code is compiled as an installation-type procedure, or the code is compiled in the background during free processor cycles. The method then outputs the native code. For example, the native code is persisted to a hard disk drive or a non-volatile memory. After the installation compilation process, the native code can be loaded and executed.

33 Claims, 5 Drawing Sheets

COMPILING AND PERSISTING OF INTERMEDIATE LANGUAGE CODE

FIELD OF THE INVENTION

This invention relates generally to intermediate languages, and more particularly to compiling and persisting of intermediate language code.

BACKGROUND OF THE INVENTION

Intermediate language-type models for programming languages have become increasingly popular. In an intermediate language model, a source code is generally compiled into a desirably substantially platform-independent intermediate language. When the code is desired to be run on a particular platform, an execution engine on that platform then interprets or compiles the intermediate language to native code understandable by the platform. Examples of systems that use intermediate languages include the Java virtual machine.

As used herein, the terminology intermediate language refers generally to an intermediate language format that is an executable format and that is designed to be run. It can be loaded with very little time and memory overhead. Each part of such a format is typically designed to allow execution with minimal effort; all information required to execute part of the code is present. Such intermediate languages include byte code as used by Java virtual machines, for example. The terminology intermediate language as used herein does not generally refer to the data communicated from the front end of a compiler—for example, a typical C compiler—to the back end of the compiler.

Interpretation of intermediate language code means that as each individual instruction of intermediate language code is encountered, it is decoded and executed. Interpretation is usually the slowest manner by which intermediate language code can be executed. Therefore, compilation of intermediate language code to native code is generally used over interpretation of the intermediate code.

With respect to intermediate language code, compilation to native code is conducted within the prior art on adjust-in-time basis, such that the process is often referred to as just-in-time compilation. Just-in-time compilation of intermediate language code to native code means that a section of intermediate language code instructions is examined and converted to a corresponding section of native code, which is then executed. Thus, as compared to interpretation, which decodes and executes IL code on a instruction-by-instruction basis, just-in-time compilation converts and executes code on a section-by-section basis.

Generally, just-in-time compilation results in faster execution than does interpretation. However, there are disadvantages to the just-in-time compilation approach. Each time a program is run, it must be reconverted to native code. Because conversion time is at a premium, just-in-time compilation often sacrifices the quality of the native code for compilation speed, resulting in native code that may be worse in quality than that generated by a traditional source code-to-native code compiler. The native code that is generated also is tailored specifically to the individual program running; multiple programs cannot usually share native code. In addition, since two versions of the program, an intermediate language version and a native version, are loaded into memory, the resource requirements of a just-in-time compiled program are generally undesirably large.

Furthermore, while just-in-time compilation results in faster execution than does interpretation, just-in-time compilation of intermediate language code to native code still typically results in much slower execution than does straight execution of native code that was compiled directly from source code. Generally, this trade-off is taken for granted as an inherent characteristic of intermediate-language code: what is gained in platform independence is lost in execution speed. Nevertheless, it is desirable for intermediate-language code to be executed as fast as possible. For these and other reasons, there is a need for the present invention.

SUMMARY OF THE INVENTION

The invention relates to compilation and persisting of intermediate language code, as this phrase has been defined in the background section. In one embodiment, a computer-implemented method first inputs intermediate language code. The method compiles this code into corresponding native code—for example, in a non-just-in-time manner. The method then outputs the native code—for example, persisting the native code to a hard disk drive or a non-volatile memory. Only then is the native code executed. In one embodiment, verifiability is provided for.

Embodiments of the invention hence differ in their approach to compilation of intermediate language code as compared to the prior art. Usually all of the intermediate language code is compiled to native code prior to the native code being executed. This means that the native code can be saved to a hard disk drive, for example, and then later executed, without the performance penalties typically associated with intermediate language code. The initial compilation of the intermediate language code into native code can be performed as a program installation-type procedure that computer users are typically accustomed to with more traditional programs compiled directly to native code from source code, or, the initial compilation can be performed in the background, while the user is doing other things.

Within embodiments of the invention, generally the conversion from intermediate language code to native code occurs on the target machine on which the native code is meant to be run. This conversion is desirably made by an optimizing compiler, which is managed within the run-time environment. The goal of the conversion is generally to preserve the benefits of intermediate language code distribution—such as verifiability, platform independence, and late binding—while achieving the performance advantage of an optimizing compiler, and not incurring run-time performance penalties.

While the prior art provides for interpretation of intermediate language code on an instruction-by-instruction basis and for just-in-time compilation of intermediate language code on a section-by-section basis, embodiments of the invention provide for complete whole-program compilation prior to execution. Execution of the resulting native code is therefore usually faster than the execution of just-in-time compiled code, and in some instances approaches that of more traditional programs compiled directly to native code from source code. Embodiments of the invention thus provide to large degree the best of both worlds: the speed of execution of more traditional programs, and the platform portability (i.e., independence) of intermediate language programs.

The invention includes computer-implemented methods, machine-readable media, computerized systems, devices and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
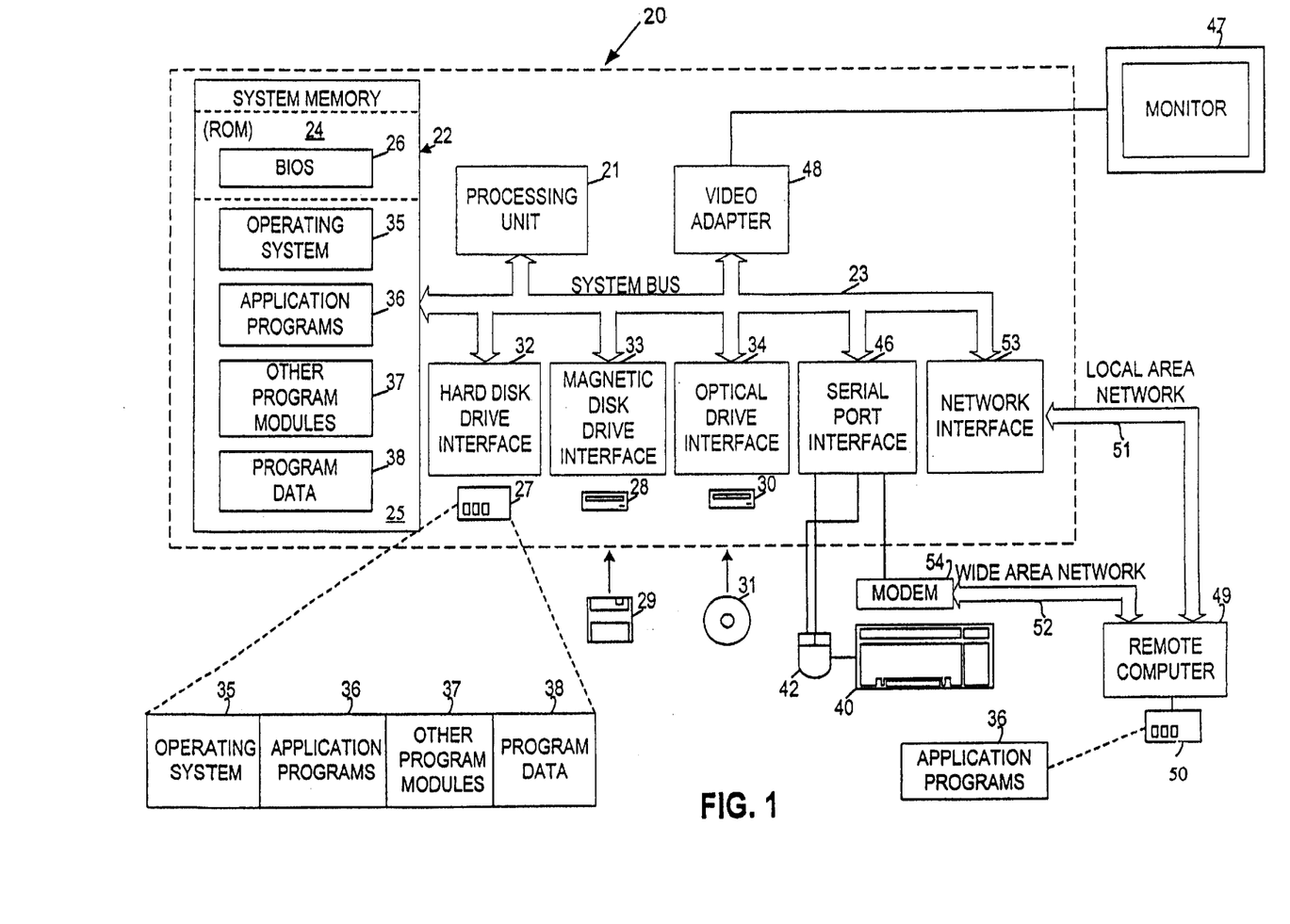
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Traditional Intermediate Language Environment

Figure 2:
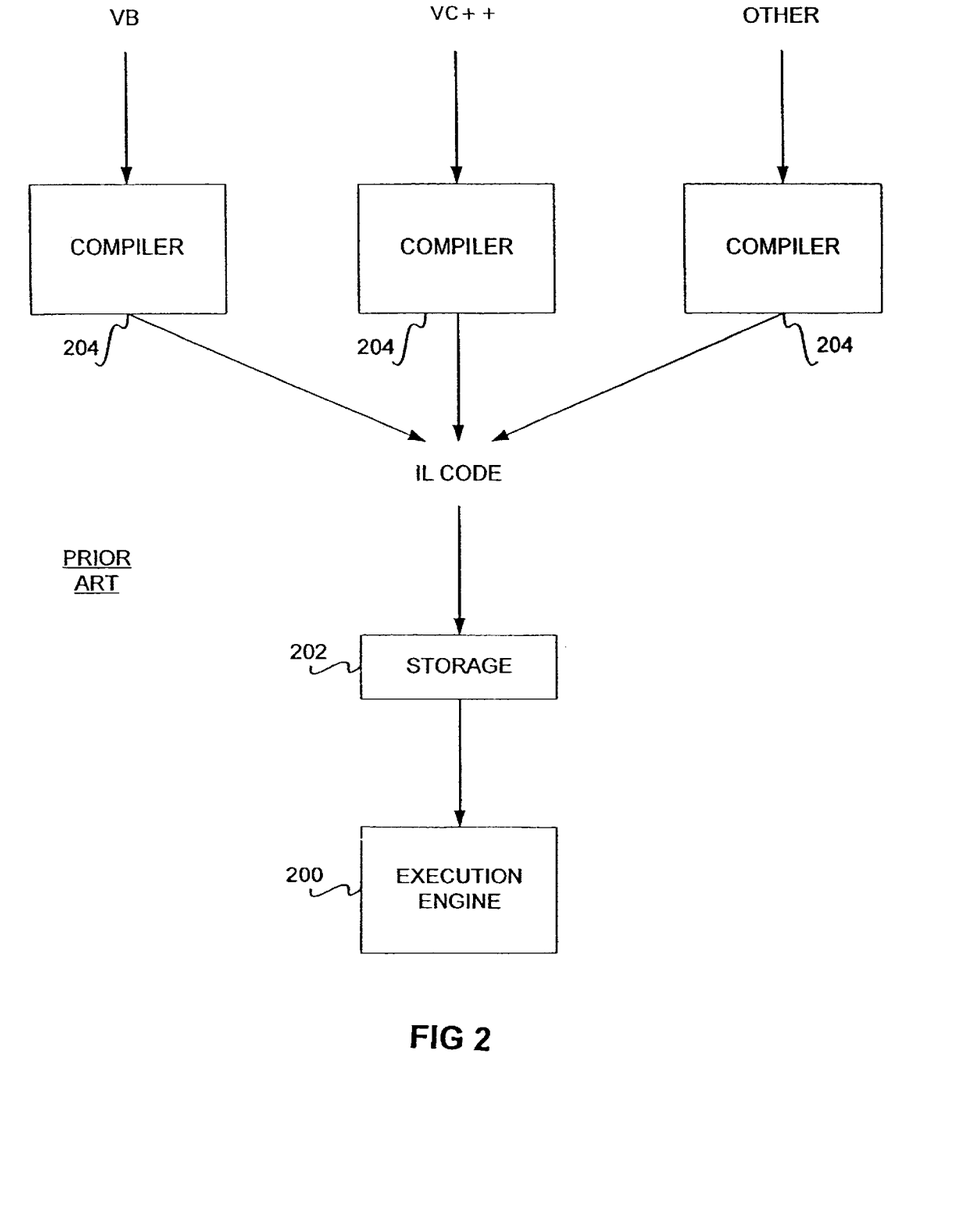
FIG. 2 is a diagram of a traditional intermediate language environment according to an embodiment of the invention

In this section, description is provided of an overview of a traditional intermediate language environment, with reference to FIG. 2. The environment of FIG. 2 includes an execution engine 200, of which a just-in-time (JIT) compiler or an interpreter is a part. Multiple source code language sources, such as Visual Basic (VB), Visual C++ (VC++), and other sources, are compiled, by compilers such as compilers 204, into intermediate language (IL) code.

The IL code is stored on a storage 202, such as a computer-readable medium like a hard disk drive, a floppy disk drive, a memory, a flash memory, etc. The execution engine 200 reads the IL code from the storage 202, and interprets or just-in-time compiles, via a mechanism such as an interpreter or just-in-timer compiler, the IL code into executable code (based on the intermediate code) native to a particular platform. This executable code is also referred to as native code.

Each of the compilers 204, the execution engine 200, and the constituent parts of the execution engine can be a computer program executed by a processor from a computer-readable medium such as a memory. Compilers such as compilers 204 are known within the art. Each of the multiple source code language source, the IL code, and the executable code can be stored as data on a computer-readable medium, such as a memory or a hard disk drive.

The execution engine 200 can be part of a system that does not include the compilers 204, such that the compilers 204 pre-compile the source code into IL code, which is then stored on a computer-readable medium within the system. Alternatively, the execution engine and its constituent parts can be part of a device, such as the computer described in the preceding section of the detailed description. Other devices include: a set-top box for a television, a hand-held device, a television set, a consumer electronics device, a laptop computer, a hand-held computer, an appliance, a desktop computer, and an automotive electronics device. Such devices typically include a processor and a machine-readable medium such as a memory, such that the execution engine 200 and its constituent parts are executed by the processor from the medium.

Significantly, the traditional environment of FIG. 2 is such that first the IL code is generated by a compiler 204, and then stored on a storage 202. When execution is desired, the IL code is input by the execution engine 200, which just-in-time compiles or interprets the IL code into native code, which is then executed. That is, the engine 200 decodes an instruction of IL code and executes it, decodes another instruction of IL code and executes it, etc. If a just-in-time compiler is part of the engine 200 instead of an interpreter, then the engine 200 just-in-time compiles a section of IL code into native code, executes the native code, just-in-time compiles another section of IL code into native code, executes that native code, etc.

If the computer program represented by the IL code is desired to be executed again, then the execution engine 200 again just-in-time compiles or interprets the IL code into native code, and again executes the native code, as described in the preceding paragraph. The native code is never stored on a storage such as the storage 202, for example. Each time the IL code is desired to be run, it must be re-just-in-time compiled or reinterpreted by the execution engine 200. Thus, the performance penalties involved with just-in-time compiled or interpreted code are incurred every time the IL code is run.

IL Environment According to an Embodiment of the Invention

Figure 3:
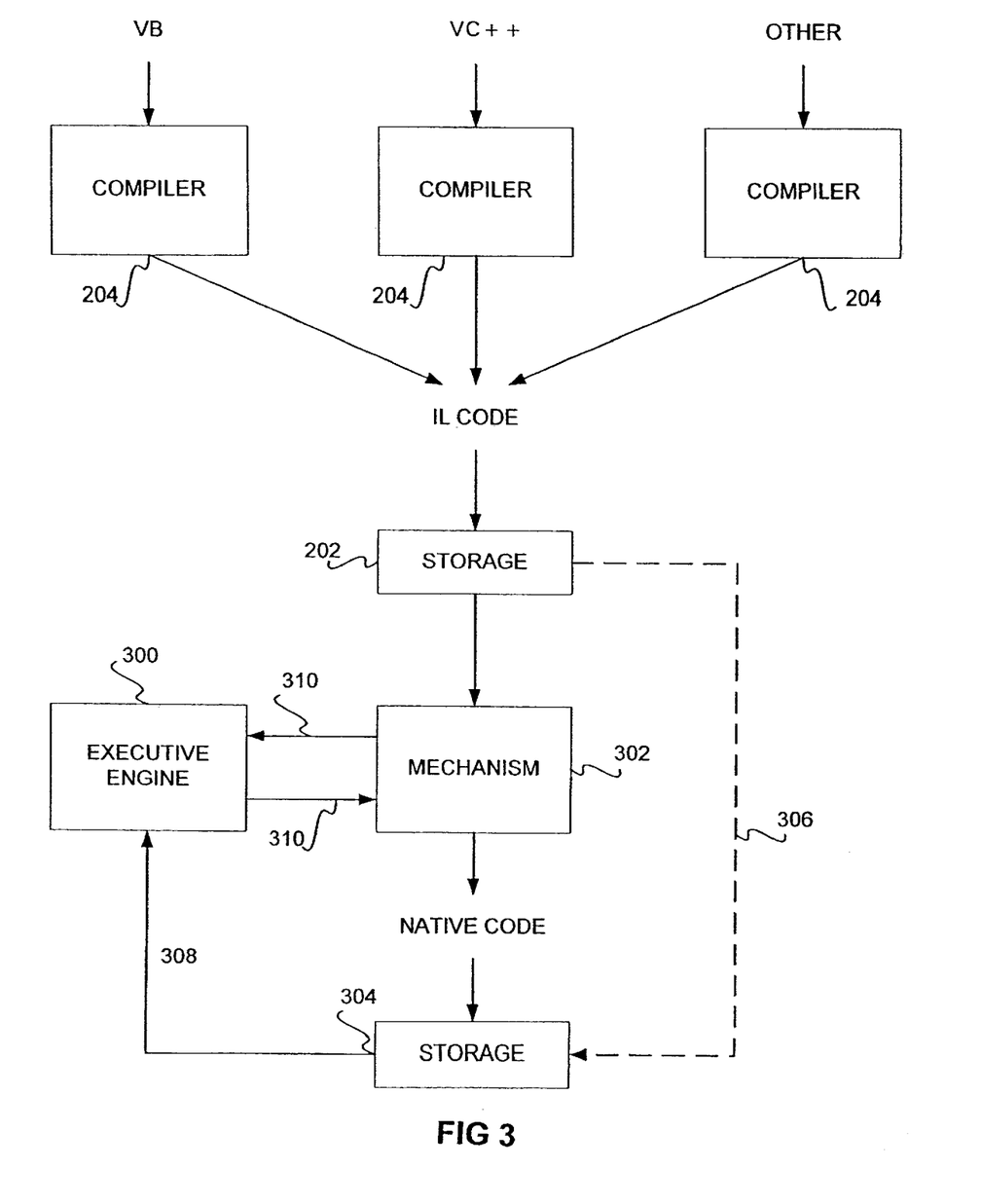
FIG. 3 is a diagram of an intermediate language environment according to an embodiment of the invention, of which a part thereof can be implemented within a system or a device according to an embodiment of the invention.

In this section, description is provided of an intermediate language environment according to an embodiment of the invention, with comparison to a traditional intermediate language environment as described in the preceding section. Referring to FIG. 3, a diagram of an intermediate language environment according to an embodiment of the invention is shown. The environment of FIG. 3 includes an execution engine 300, of which a just-in-time (JIT) compiler is a part. Multiple source code language sources, such as Visual Basic (VB), Visual C++ (VC++), and other sources, are compiled, by compilers such as compilers 204, into intermediate language (IL) code.

The IL code is stored on a storage 202, such as a computer-readable medium like a hard disk drive, a floppy disk drive, a memory, a flash memory, etc. However, rather than the execution engine 200 reading the IL code from the storage 202, and just-in-time (JIT) compiling the code so that the program represented by the IL code can be run, as is the case in a traditional IL environment, a mechanism 302 first generates native code corresponding to the IL code in a non-just-in-time manner. This native code is then stored on a storage 304, which can be the same storage as the storage 202, as indicated by dotted line 306. Only then is the native code (i.e., executable code) executed; that is, only then is the program run, as is described in more detail later in the detailed description.

Each of the compilers 204, the mechanism 302, the execution engine 300, and the constituent parts of the execution engine can be a computer program executed by a processor from a computer-readable medium such as a memory, as in the traditional IL environment. Compilers such as compilers 204 are known within the art. Also as in the traditional IL environment, each of the multiple source code language source, the IL code, and the executable code can be stored as data on a computer-readable medium, such as a memory or a hard disk drive.

Similar to a traditional IL environment, the execution engine 300 can be part of a system that does not include the compilers 204, such that the compilers 204 pre-compile the source code into IL code, and the mechanism 302 pre-compiles the IL code into native code, which is stored on a computer-readable medium within the system. The execution engine and its constituent parts can be part of a device, such as the computer described in the preceding section of the detailed description. Other devices include: a set-top box for a television, a hand-held device, a television set, a consumer electronics device, a laptop computer, a hand-held computer, an appliance, a desktop computer, and an automotive electronics device. Such devices typically include a processor and a machine-readable medium such as a memory, such that the execution engine 300 and its constituent parts are executed by the processor from the medium.

The manner by which the mechanism 302 generates native code in a non-just-in-time manner, as well as the purpose of the generation and saving of this native code to the storage 304, is now described. In one embodiment, the mechanism 302, interacting with the just-in-time compiler of the execution engine 300, as represented by the arrows 310, compiles the IL code to native code in an installation-type manner per user command. For example, a user may download the IL code from a web site, and save the code to the storage 202. The mechanism 302 may then query whether the user wishes to generate native code and persist the native code (that is, save it) now; or, the user may later run the mechanism 302 to accomplish this.

In either case, the mechanism 302 generates the native code and saves it to the storage 304—and significantly does not execute the native code as it is being generated, as is done in the traditional IL code environment. Rather, the code is generated in an installation-type manner that the user may be familiar with for more traditional (that is, non-IL code) computer programs, where an installation procedure is required to first install the program on the user's computer before it can be run. In a somewhat similar manner, before the IL code can be run, it is first completely compiled to native code, which is then saved, and which can then be run. The solid line 308 thus shows how the native code is loadable off the storage 304, for execution by the execution engine 300.

In another embodiment, the non-just-in-time manner by which the IL code is translated into native code by the mechanism 302 is as a background process, during free processor cycles. For example, the user may download the IL code off a web site, and then while the user is doing other tasks, any free processor cycles are used by the mechanism 302 to compile the IL code into native code, ultimately compiling the entirety of the IL code into native code and saving the native code on the storage 304. Ideally, the user will not want to actually run the IL code until it has been completely compiled into native code, which can then be executed.

In either of the described non-just-in-time manners by which the IL code is compiled into native code, or any other non-just-in-time manner in accordance with an embodiment of the invention, the native code is stored on the storage 304. Because the storage 304 is in one embodiment the same storage as the storage 202, this means that in one embodiment the IL code saved on the storage 202 also persists along with the native code. When the user desires to run the computer program that he or she, for example, downloaded as IL code from a web site, the native code to which the IL code was compiled is executed by the execution engine 300.

The execution engine 300 is different than the execution engine 200 of FIG. 2 (that is, of the traditional IL environment), because it is able to execute pre-compiled native code, instead of just being able to just-in-time compile (or, alternatively, interpret) IL code into native code, which is executed as the IL code is just-in-time compiled (or interpreted). Because the execution engine 300 does not have to just-in-time compile the IL code of a computer program to native code in order to run the program, the execution speed of the program is typically faster in the IL environment of the embodiment of FIG. 3 than is the case in a traditional IL environment, such as that of FIG. 2. The native code, in other words, is already generated, and thus the execution engine 300 just has to retrieve the native code from the storage 304 and execute it, as opposed to retrieving IL code, just-in-time compiling or interpreting the IL code to native code, and then executing the native code.

In the following sections of the detailed description, several specific aspects and advantages of pre-compiling IL code to native code prior to execution, in accordance with embodiments of the invention, are described. A more specific embodiment of the invention outlining the compilation process from IL code to native code, according to an embodiment of the invention, is described in another section of the detailed description. Finally, a method according to one embodiment of the invention is presented that shows one specific manner for execution of the native code pre-compiled from IL code by the execution engine.

Program Optimization

In this section of the detailed description, an advantage and aspect of the process for compiling IL code to native code in a non-installation-type manner, according to one embodiment of the invention, is described. Specifically, the aspect relates to program optimization. Those of ordinary skill within the art, however, will be able to appreciate that the invention itself is not limited to a process for compiling IL code to native code in a non-installation-type manner including this program optimization.

Whole program optimization refers to the process of optimizing a computer program so that it will run more efficiently and more quickly, by analyzing the program as it is being compiled to executable code, and making modifications to the executable code based on the analysis. Embodiments of the invention allow for whole program optimization, because the IL code of a program is compiled to native code without performance constraints. That is, the mechanism that compiles the IL code to native code does not have to concern itself with the speed at which it compiles the code to native code. This luxury thus enables the mechanism to conduct whole program optimization, as those of ordinary skill within the art can appreciate.

Whole program optimization is known within the art; the invention is not limited to any particular manner by which such optimization can be afforded. Whole program optimization is more specifically described in the reference Craig Chambers, Jeffrey Dean, and David Grove, *Whole-Program Optimization of Object-Oriented Languages,* Technical report UW-CSE-96-06-02, University of Washington, 1996.

It is noted that whole program optimization is an advantage afforded by embodiments of the invention not present in traditional IL environments. For example, a JIT compiler in traditional IL environments can conduct at best partial program optimization, at the method level of an object. This is because the JIT compiler must compile a section of the code to native code, which is then immediately executed. The JIT compiler does not have the luxury of being able to refine the code it previously generated at a later point in time because it has already been executed. Conversely, the mechanism of embodiments of the invention is able to so refine the code.

Execution Profiling

In this section of the detailed description, an aspect of the process for compiling IL code to native code in a non-installation-type manner, according to one embodiment of the invention, is described. Specifically, the aspect relates to execution profiling. Those of ordinary skill within the art, however, will be able to appreciate that the invention itself is not limited to a process for compiling IL code to native code in a non-installation-type manner including this execution profiling.

Profiling allows a developer to learn where a program spent its time and which functions called which other functions while it was executing. This information can show the developer which pieces of the program are slower than expected, such that they might be candidates for rewriting to make the program execute faster. It can also indicate which functions are being called more or less often than expected. This may assist in spotting bugs that had otherwise been unnoticed. Profiling is known within the art, and the invention is not particularly limited to any specific manner of profiling.

Profiling is provided for by at least some embodiments of the invention since the speed at which the native code compiled from the IL code is run is increased because the compilation completely occurs before the native code is executed.

Versioning

In this section of the detailed description, an aspect of the process for compiling IL code to native code in a non-installation-type manner, according to one embodiment of the invention, is described. Specifically, the aspect relates to versioning. Those of ordinary skill within the art, however, will be able to appreciate that the invention itself is not limited to a process for compiling IL code to native code in a non-installation-type manner including this versioning.

In the context of the patent application, versioning refers to storing information regarding the environment in which the IL code has been compiled to native code by the mechanism. This information is then compared against current information when the native code is run by the execution engine. If the information differs, then this may portend a security or other problem with the native code as it now exists vis-à-vis the current environment. The execution engine may decide to not run the code, or may decide to just-in-time compile the particular section of code that failed the versioning check, as is done in traditional IL environments. In either case, the IL code may be scheduled for recompilation to native code, for example, as a background process as has been described.

In one embodiment, versioning includes storing information such as the classes of objects that have been loaded already when a given method is compiled into native code. When the method is then executed by the execution engine, it is determined whether these same classes of objects are also already loaded, and/or the same versions of these classes have been loaded. If there is a mismatch, then a corrective measure is taken, as outlined in the preceding paragraph. It is noted that versioning is known within the art, and that the invention is not limited to any particular type of data being matched at run-time in the versioning process. Versioning may be performed on a class-by-class basis.

Verification

In this section of the detailed description, an aspect of the process for compiling IL code to native code in a non-installation-type manner, according to one embodiment of the invention, is described. Specifically, the aspect relates to verification. Those of ordinary skill within the art, however, will be able to appreciate that the invention itself is not limited to a process for compiling IL code to native code in a non-installation-type manner including this verification.

Verification is known in the art, and in traditional IL environments can be turned on during the execution process. Verification ensures that executable code is well behaved, and does not violate any security rules that may have been established for the executable code. The problem with traditional IL environments is that verification is frequently turned off by the user running a given program, because it adds a performance penalty, slowing down execution of the program. Turning off verification, however, means that potential security issues may arise.

Conversely, as to embodiments of the invention, there is no incentive to turn off verification during the compilation process from IL code to native code. Because verification is performed by embodiments of the invention during the compilation process, there is no performance penalty. The execution of the native code does not have to be verified, since the code was already verified during compilation.

Compilation Method

In this section of the detailed description, a computer-implemented method according to an embodiment of the invention is described. The method specifically relates to the compilation of IL code to native code in a non-just-in-time manner. The computer-implemented method can be realized at least in part as one or more programs running on a computer (such as the computer of FIG. 1)—that is, as a program executed from a computer-readable medium such as a memory by a processor of a computer. The programs are desirably storable on a machine-readable medium such as a floppy disk or a CD-ROM, for distribution and installation and execution on another computer.

Figure 4:
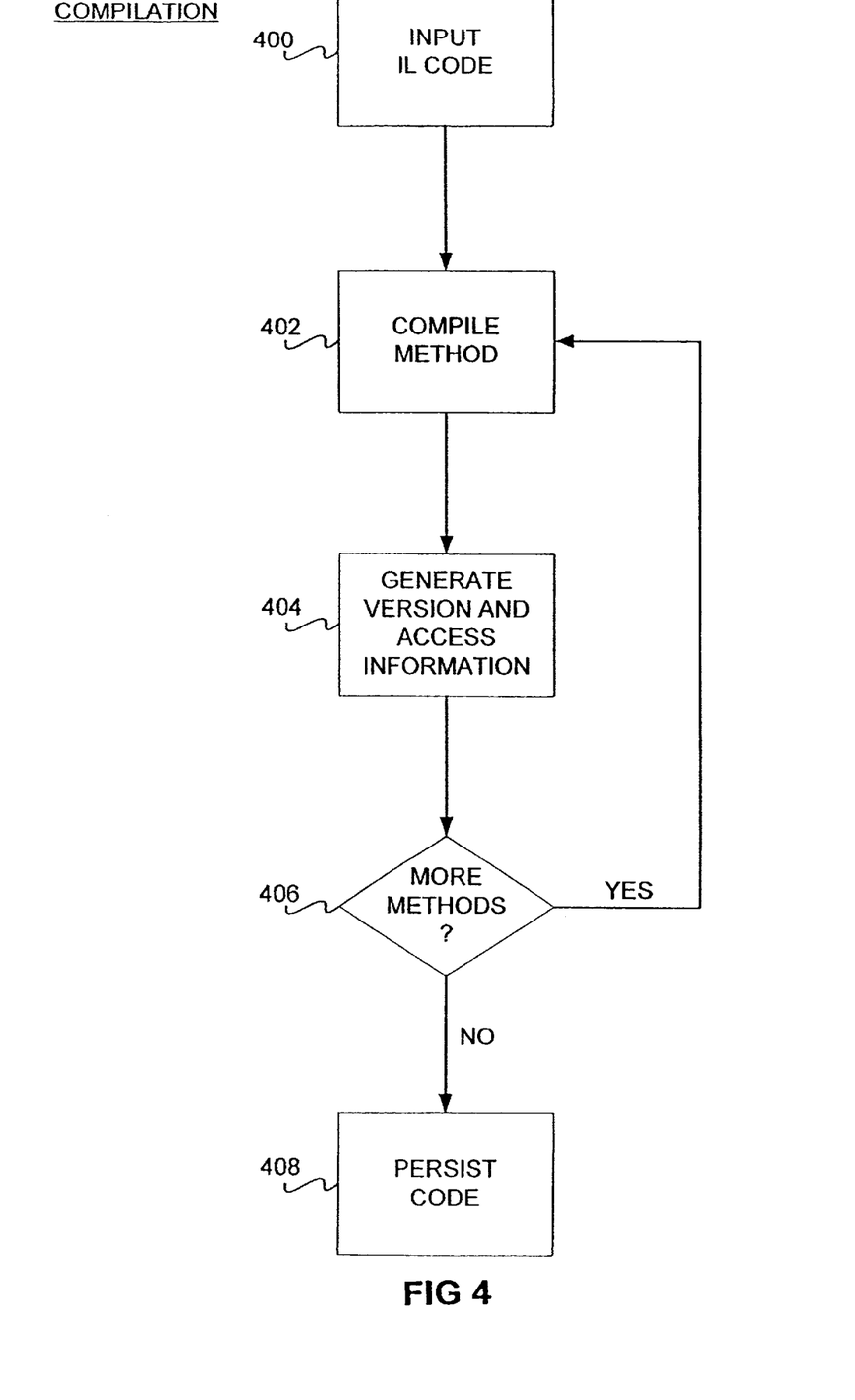
FIG. 4 is a flowchart of a method showing how intermediate language code is installation compiled into native code, according to one embodiment of the invention; and, FIG. 5 is a flowchart of a method showing how native code that has been installation compiled from intermediate language code according to one embodiment of the invention is executed, according to an embodiment of the invention.

Referring now to FIG. 4, in 400, the IL code for a computer program is input. The invention is not limited to the manner by which the code is input. For example, the code may be read off a CD-ROM, or it may be downloaded off the Internet and saved to a hard disk drive, from where it is retrieved.

In one embodiment, inputting the IL code includes loading the metadata of the IL code, which includes information such as, but not limited to, the structure of a program, including information that may not be needed for execution, such as human-readable names of methods, etc., but which are useful for later analysis by developers via support tools, as known in the art. The object classes of the program are laid out, so that each method of each object is enumerated. That is, the methods of the IL code are determined. An execution engine including a just-in-time compiler may be initialized at this time as well.

In 402, the first method of the IL code is compiled to native code. This is performed in conjunction with the just-in-time compiler of the execution engine. That is, the mechanism performing the method of FIG. 4 passes the IL code section pertaining to the method to the execution engine, which just-in-time compiles the code, and returns the resulting native code. In one embodiment, a standard compiler is substituted for the just-in-time compiler, in which case such a compiler has knowledge as to the manner by which to generate code for later execution by the execution engine.

As can be appreciated by those of ordinary skill within the art, because the compilation is conducted not at run-time, there may be data referenced by the current method being compiled that is unavailable to the just-in-time compiler. In such instances, access to such data that is available only at run-time must be routed in an alternate manner. In one embodiment, alternate entry points and/or alternate return values are provided, such that a value that would have normally been supplied by the execution engine at run-time is converted into what can be referred to as a cookie to be persisted. Persistence of the cookie is accomplished by storing the cookie in a table, in one embodiment, although the invention is not so limited.

During actual run-time, when the execution engine encounters an alternative entry point in the native code, it references the cookie in the table to determine what actual information should be substituted therefor. That is, the alternative routing to indirectly reference data that is not available at compile-time is performed so that at run-time the execution engine is able to correct this situation. Information for which cookies may be stored include structure layout and run-time data structures, which are usually computed dynamically at run-time. In other words, the compilation process performs only some early binding—that is, partial early binding—of the data, since it does not have access to all the data at compile-time.

In 404, this access information, as well as version information regarding the current environment in which the current method of the IL code is being compiled into native code, is generated and maintained. The access information refers to information relating to data access routing as described in the preceding two paragraphs. The version information refers to information about classes already loaded, certain hardware parameters such as the type and number of processors, the instruction set of the processor(s), the performance characteristics of the processor(s), the operating system type and version, as well as other information that can be used at execution to ensure that the executable code generated in 402 can be safely run, as described in a preceding section of the detailed description. In another embodiment, versioning is simply checking to make sure that the code is running on the same machine, and linking against the same files, as known within the art, as when it was compiled.

In either 402 or 404, verification of the IL code being compiled into native code may be performed, as described in a preceding section of the detailed description. If verification fails, then the method can in one embodiment so notify the user that the code is not safe from a security standpoint. The user then may have the option to cancel the compilation of the IL code to native code. Furthermore, whole program optimization can occur at any point of compilation. For example, it can occur after all the methods have been compiled to native code, or it can occur after each method has been compiled to native code. Whole program optimization implies that some methods may thus be recompiled to native code, so as to take advantage of information not known when the methods were originally compiled to native code.

In 406 it is determined whether there are any more methods of the IL code to be compiled into native code. If there are, then the method returns to 402, to compile a next method as described. If there are not any more methods, then the method proceeds to 408. In 408, the code is output, desirably by being persisted. Persistence of code refers to the storing of code in a non-volatile manner, for example, on a hard disk drive, so that the code can later be loaded. At least the native code is persisted; however, desirably the IL code from which the native code has been compiled is also persisted, so that the native code may be regenerated as necessary, although this is not required. In addition to the persistence of code, the version and access information is also persisted.

In one embodiment, persistence is accomplished as follows. A file is generated that, when executed by the operating system, automatically invokes the execution engine, so that the native code can begin being executed by the execution engine. The file desirably includes the original input metadata of the IL code, which may be needed by the execution engine; the native code generated from the IL code; an entry point that activates the execution engine after the operating system has loaded the file; the cookie tables as have been described; and version information as has been described. Furthermore, any other "fix ups" that the compilation process may have determined need to be performed by the execution engine prior or during execution, or by the operating system during loading of the file, may also be included.

Execution Method

In this section of the detailed description, a computer-implemented method according to an embodiment of the invention is described. The method specifically relates to the execution of native code that has been previously compiled from IL code and persisted—for example, in accordance with the method of the previous section of the detailed description. The computer-implemented method can be realized at least in part as one or more programs running on a computer (such as the computer of FIG. 1)—that is, as a program executed from a computer-readable medium such as a memory by a processor of a computer. The programs are desirably storable on a machine-readable medium such as a floppy disk or a CD-ROM, for distribution and installation and execution on another computer.

Figure 5:
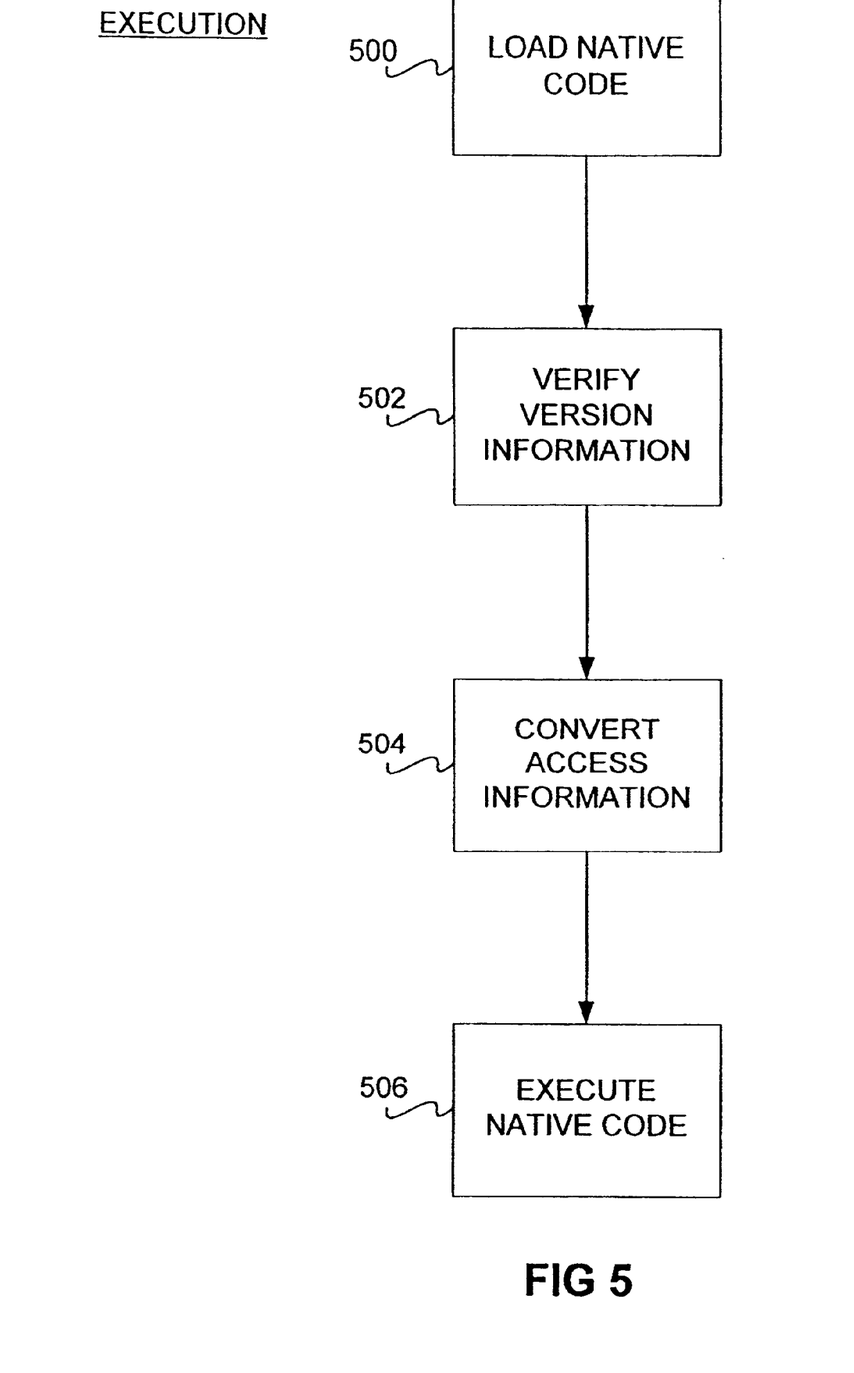

Referring to FIG. 5, a computer-implemented method according to an embodiment of the invention is shown. In 500, the native code previously compiled from IL code is loaded. More specifically, each method of the native code is loaded, as well as the version information and the access information, and any other information that has been persisted in the process of compiling IL code to native code.

In 502, the version information of the native code is verified against the current environment. If a mismatch between the version information persisted and the information regarding the current environment is detected, then the offending methods may be just-in-time compiled from IL code to native code when their execution is needed, as is typically done in a traditional IL environment. This new native code, in other words, is executed in lieu of the native code previously compiled from the IL code and persisted. This method may also be flagged for later recompilation to native code as a background process, so that, for example, the native code can be optimized in a manner not possible in just-in-time compiling, as has been described.

Next, in 504, the access information that was previously persisted is converted, using the information now currently available to the execution engine. This includes, for example, reading the table storing the cookies, and converting them to the values that they would have had if the compilation process had occurred at run-time (e.g., now). For example, a cookie may refer to an address of a routine which was not known at compilation-time, but which is now known. It is noted that one or more of 500, 502 and 504 can be accomplished by what is known in the art as a class loader of the execution engine.

Finally, in 506, the native code is executed. As has been stated, the native execution is executed on a much faster basis than is the case in more traditional IL environments, because the native code, notwithstanding any version matches, has already been compiled from IL code. The native code is executed by the execution engine in one embodiment.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   inputting an intermediate-language code;
   generating version information regarding a current environment;
   for each method of the intermediate-language code, calling a compiler to compile the method into native code and generating access information such that access to data only available at run-time is routed in an alternate manner; and,
   persisting the native code of each method, the version information, and the access information.

2. The method of claim 1, further comprising:
   loading the native code of each method, the version information, and the access information;
   verifying the version information against a new current environment;
   converting the access information using information now currently available; and, executing the native code.

3. The method of claim 2, wherein verifying the version information against a new current environment comprises, upon detecting a mismatch between the version information and the new current environment, just-in-time compiling the intermediate language code into new native code, such that the new native code is executed in lieu of the native code previously compiled and persisted.

4. The method of claim 1, wherein generating version information about a current environment comprises generating version information about at least one of: classes that have been loaded and hardware parameters.

5. The method of claim 1, wherein generating access information such that access to data only available at run-time is routed in an alternate manner comprises storing an indirect reference to the data in a table for later correction at run-time.

6. A computer-implemented method comprising:
   loading native code of each of a plurality of methods previously compiled from intermediate-language code to the native code;
   loading version information regarding an environment in which the intermediate-language code was compiled to the native code;
   loading access information generated at compile-time to route in an alternate manner access to data only available at run-time;
   verifying the version information against a new current environment;
   converting the access information using information now currently available; and,
   executing the native code.

7. The method of claim 6, wherein verifying the version information against a new current environment comprises, upon detecting a mismatch between the version information and the new current environment, just-in-time compiling the intermediate language code into new native code, such that the new native code is executed in lieu of the native code previously compiled and persisted.

8. A device comprising:
   a processor;
   a computer-readable medium;
   first data stored on the medium representing native code of each of a plurality of methods previously compiled from intermediate-language code to the native code;
   second data stored on the medium representing version information regarding an environment in which the intermediate-language code was compiled to the native code;
   third data stored on the medium representing access information generated at compile-time to route in an alternate manner access to data only available at run-time;
   an execution engine executed by the processor to verify the version information against a new current environment, to convert the access information using information now currently available, and to execute the native code.

9. The device of claim 8, wherein the device is selected from a group essentially consisting of: a set-top box, a hand-held device, a television set, a consumer electronics device, a desktop computer, a laptop computer, a hand-held computer, an appliance, and an automotive electronics device.

10. The device of claim 8, wherein the execution engine further is to, upon detecting a mismatch between the version information and the new current environment, just-in-time compile the intermediate language code into new native code, such that the new native code is executed in lieu of the native code previously compiled.

11. A machine-readable medium having instructions stored thereon for execution by a processor to perform a method comprising:
    inputting an intermediate-language code;
    generating version information regarding a current environment;
    for each method of the intermediate-language code, calling a just-in-time compiler to compile the method into native code and generating access information such that access to data only available at run-time is routed in an alternate manner; and, persisting the native code of each method, the version information, and the access information.

12. A machine-readable medium having instructions stored thereon for execution by a processor to perform a method comprising:

loading native code of each of a plurality of methods previously compiled from intermediate-language code to the native code;

loading version information regarding an environment in which the intermediate-language code was compiled to the native code;

loading access information generated at compile-time to route in an alternate manner access to data only available at run-time;

verifying the version information against a new current environment;

converting the access information using information now currently available; and, executing the native code.

13. A machine-readable medium having instructions stored thereon for execution by a processor to perform a method comprising:

inputting an intermediate-language code;

generating version information regarding a current environment;

for each method of the intermediate-language code, calling a non-just-in-time compiler to compile the method into native code and generating access information such that access to data only available at run-time is routed in an alternate manner; and, persisting the native code of each method, the version information, and the access information.

14. A computer-implemented method comprising:

inputting an intermediate-language code;

generating version information regarding a current environment;

calling a compiler to compile a method of the intermediate-language code into native code and to generate access information such that access to data only available at run-time is made available by persisting a reference to the data and inserting an entry point such that the reference to the data is accessed when the entry point is encountered at the run-time.

15. The method of claim 14, further comprising:

loading the native code of each method, the version information, and the access information;

verifying the version information against a new current environment;

converting the access information using information now currently available; and executing the native code.

16. The method of claim 15, wherein verifying the version information against a new current environment comprises, upon detecting a mismatch between the version information and the new current environment, just-in-time compiling the intermediate language code into new native code, such that the new native code is executed in lieu of the native code previously compiled and persisted.

17. The method of claim 14, wherein generating version information about a current environment comprises generating version information about at least one of: classes that have been loaded and hardware parameters.

18. The method of claim 14, wherein generating access information such that access to data only available at run-time comprises storing an indirect reference to the data in a table for later correction at run-time.

19. A computer-implemented method comprising:

loading native code of each of a plurality of methods previously compiled from intermediate-language code to the native code;

loading version information regarding an environment in which the intermediate-language code was compiled to the native code;

loading access information generated at compile-time, the access information providing access to data only available at run-time by providing an indirect reference to the data;

verifying the version information against a new current environment;

converting the access information using information now currently available; and executing the native code.

20. The method of claim 19, wherein verifying the version information against a new current environment comprises, upon detecting a mismatch between the version information and the new current environment, just-in-time compiling the intermediate language code into new native code, such that the new native code is executed in lieu of the native code previously compiled and persisted.

21. A computer-implemented method comprising:

determining whether previously generated and persisted native code generated from an intermediate-language code is suitable for execution in a current environment of a target machine; and compiling the intermediate-language code to produce new native code when the determining step determines that the native code is not suitable for execution in the current environment.

22. The method of claim 21, wherein the determining step includes determining whether previously persisted version information matches version information of the current environment on the target machine.

23. The method of claim 21 wherein the intermediate-language code is persisted.

24. The method of claim 21, wherein the compiling step is performed in a just-in-time manner.

25. A computerized system comprising:

a processor;

a machine-readable medium;

a mechanism executed by the processor to compile an intermediate-language code into corresponding native code in a non-just-in-time manner and to persist the native code to the medium;

an execution engine to determine whether the persisted native code is suitable for a current environment of a target machine and, the intermediate code being compiled in a just-in-time manner to generate new native code when the execution engine determines that the persisted native code is not suitable for the current environment.

26. The computerized system of claim 25, wherein the execution engine checks persisted version information against the current environment to determine whether the native code is suitable.

27. The computerized system, of claim 25, wherein the intermediate language code is persisted.

28. The system of claim 25, wherein the mechanism is to compile the intermediate-language code into the corresponding native code in accordance with one of: an installation-type manner per user command; and, during free processor cycles as a background process.

29. The system of claim 25, wherein the mechanism further is to perform whole-program optimization on the intermediate-language code.

30. A machine-readable medium having instructions stored thereon for execution by a processor to perform a method comprising:

determining whether previously generated and persisted native code generated from an intermediate-language code is suitable for execution in a current environment of a target machine; and compiling the intermediate-language code to produce new native code when the determining step determines that the native code is not suitable for execution in the current environment.

31. The medium of claim 30, wherein the determining step includes determining whether previously persisted version information matches version information of the current environment on the target machine.

32. The medium of claim 30 wherein the intermediate-language code is persisted.

33. The medium of claim 30, wherein the compiling step is performed in a just-in-time manner.

* * * * *

UNITED STATES PATENT AND TRADEMARK OFFICE
CERTIFICATE OF CORRECTION

PATENT NO.    : 6,484,313 B1
DATED         : November 19, 2002
INVENTOR(S)   : Sean E. Trowbridge et al.

It is certified that error appears in the above-identified patent and that said Letters Patent is hereby corrected as shown below:

Column 1,
Line 41, "adjust-in- time" has been replaced with -- a just-in-time --.

Signed and Sealed this

Twenty-second Day of July, 2003

JAMES E. ROGAN
*Director of the United States Patent and Trademark Office*